United States Patent
Panagis et al.

(10) Patent No.: US 10,634,924 B2
(45) Date of Patent: Apr. 28, 2020

(54) DISPLAY PROJECTOR OPERATION

(71) Applicant: Ford Global Technologies, LLC, Dearborn, MI (US)

(72) Inventors: Timothy Panagis, Ypsilanti, MI (US); Christopher Melgar, Royal Oak, MI (US); Peter Lazarevski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 23 days.

(21) Appl. No.: 15/847,228

(22) Filed: Dec. 19, 2017

(65) Prior Publication Data

US 2019/0187481 A1   Jun. 20, 2019

(51) Int. Cl.
| | |
|---|---|
| *G02B 27/01* | (2006.01) |
| *B60R 11/02* | (2006.01) |
| *B60R 16/023* | (2006.01) |
| *G01B 7/315* | (2006.01) |
| *B60R 11/00* | (2006.01) |
| *B60K 35/00* | (2006.01) |
| *G01B 21/16* | (2006.01) |
| *G01B 7/02* | (2006.01) |

(52) U.S. Cl.
CPC .......... *G02B 27/0179* (2013.01); *B60K 35/00* (2013.01); *B60R 11/02* (2013.01); *B60R 16/0231* (2013.01); *G02B 27/01* (2013.01); *G02B 27/0101* (2013.01); *G02B 27/0149* (2013.01); *B60R 2011/0092* (2013.01); *G01B 7/023* (2013.01); *G01B 7/315* (2013.01); *G01B 21/16* (2013.01); *G02B 2027/0141* (2013.01); *G02B 2027/0159* (2013.01); *G02B 2027/0183* (2013.01)

(58) Field of Classification Search
USPC .......................................................... 701/49
See application file for complete search history.

(56) References Cited

U.S. PATENT DOCUMENTS

| | | | | |
|---|---|---|---|---|
| 5,519,489 A | * | 5/1996 | McClenahan | G01B 11/2755 33/203.15 |
| 6,069,656 A | * | 5/2000 | Silver | G01S 17/89 348/169 |
| 6,181,993 B1 | * | 1/2001 | Dale, Jr. | G01B 11/275 33/203.18 |
| 7,532,175 B2 | | 5/2009 | Aoki et al. | |
| 7,777,960 B2 | * | 8/2010 | Freeman | H04N 9/3129 345/7 |
| 10,083,509 B2 | * | 9/2018 | Fey | H04N 17/002 |

(Continued)

FOREIGN PATENT DOCUMENTS

| | | |
|---|---|---|
| JP | 2015226304 A | 12/2015 |
| JP | 2016193706 A | 11/2016 |

(Continued)

*Primary Examiner* — Jean Paul Cass
(74) *Attorney, Agent, or Firm* — Frank Lollo; Bejin Bieneman PLC (57) ABSTRACT

A system includes a computer including a processor and a memory, the memory storing instructions executable by the processor to determine a vehicle ride height, determine an angle of a display projector in a vehicle instrument panel based on the ride height, and actuate a motor to move the display projector to the projector angle.

19 Claims, 4 Drawing Sheets

(56) References Cited

U.S. PATENT DOCUMENTS

| | | | |
|---|---|---|---|
| 2008/0192204 A1* | 8/2008 | Prat Bartomeu | A61B 3/113 351/209 |
| 2009/0005961 A1* | 1/2009 | Grabowski | G01C 21/365 701/532 |
| 2009/0059336 A1* | 3/2009 | Dunphy | G02B 26/008 353/33 |
| 2014/0013972 A1* | 1/2014 | Veres | G03G 13/283 101/142 |
| 2014/0016112 A1* | 1/2014 | Veres | G03G 17/02 355/77 |
| 2015/0224845 A1* | 8/2015 | Anderson | B60G 17/019 701/37 |
| 2016/0121905 A1* | 5/2016 | Gillingham | B62D 6/002 701/37 |
| 2017/0355371 A1* | 12/2017 | Higgins | B60W 10/30 |
| 2017/0368933 A1* | 12/2017 | Drill | F16H 57/035 |
| 2018/0056745 A1* | 3/2018 | Saylor | B60G 17/0165 |
| 2018/0111440 A1* | 4/2018 | D'Amato | B60G 17/018 |
| 2018/0141399 A1* | 5/2018 | Khaja | B60G 11/14 |
| 2018/0251000 A1* | 9/2018 | Norton | B60G 17/01908 |

FOREIGN PATENT DOCUMENTS

| KR | 20170054637 A | 5/2017 |
|---|---|---|
| KR | 101756252 B1 | 7/2017 |

* cited by examiner

DISPLAY PROJECTOR OPERATION

BACKGROUND

Vehicles can include displays to show information to vehicle users. The information can include, e.g., vehicle speed, fuel efficiency, a current time, etc. However, a vehicle display may vibrate when the vehicle travels along an uneven road, e.g., a road with uneven terrain (e.g., gravel, dirt, etc.). It is a problem to present the information to the vehicle users while the vehicle vibrates from the uneven road.

DETAILED DESCRIPTION

A system includes a computer including a processor and a memory, the memory storing instructions executable by the processor to determine a vehicle ride height, determine an angle of a display projector in a vehicle instrument panel based on the ride height, and actuate a motor to move the display projector to the projector angle.

The instructions can further include instructions to determine a ride height for each of a plurality of wheels, to determine an average ride height based on the determined ride heights, and then determine the projector angle based on the average ride height.

The instructions can further include instructions to actuate the display projector to display an image on a windshield. The instructions can further include instructions to display the image on a location of the windshield to overlay with a roadway segment. The instructions can further include instructions to display vehicle operating information on the windshield.

The instructions can further include instructions to determine a neutral position of an image projected by the display projector and to determine the projector angle based on the ride height and a change in a height of the image from the neutral position.

The instructions can further include instructions to determine the projector angle to dampen movement of an image projected onto a windshield.

A system includes a display, a projector directed at the display, a motor connected to the projector, a wheel of a vehicle, means for determining a vehicle ride height, means for determining an angle of the projector in a vehicle instrument panel, and means for moving the projector to the projector angle.

The system can further include means for actuating the display projector to display an image on a windshield. The system can further include means for displaying vehicle operating information on the windshield.

The system can further include means for determining the projector angle to dampen vibrations from the wheel.

The system can further include means for determining a neutral position of an image projected by the display projector and means for determining the projector angle based on the ride height and a change in a height of the image from the neutral position.

A method includes determining a vehicle ride height, determining an angle of a display projector in a vehicle instrument panel based on the ride height, and actuating a motor to move the display projector to the projector angle.

The method can further include determining a ride height for each of a plurality of wheels, determining an average ride height based on the determined ride heights, and then determining the projector angle based on the average ride height.

The method can further include actuating the display projector to display an image on a windshield. The method can further include displaying the image on a location of the windshield to overlay with a roadway segment. The method can further include displaying vehicle operating information on the windshield.

The method can further include determining a neutral position of an image projected by the display projector and determining the projector angle based on the ride height and a change in a height of the image from the neutral position.

The method can further include determining the projector angle to dampen movement of an image projected onto a windshield.

To reduce movement of a projected heads-up display in a vehicle, a vehicle computer can determine a ride height for each wheel and can adjust a projector angle of a display projector based on the ride height. A change in the ride height can result in vibrations in a vehicle cabin, and can cause the heads-up display to move on a windshield relative to a vehicle user, blurring the display and/or making the display difficult to view. To reduce the movement of the heads-up display, e.g., resulting from vibration as the vehicle travels on a road, the vehicle computer can actuate a motor to adjust the projector angle based on the change in the ride height. Advantageously, vibration of the display can be reduced and the vehicle user can more easily view the display.

Figure 1:
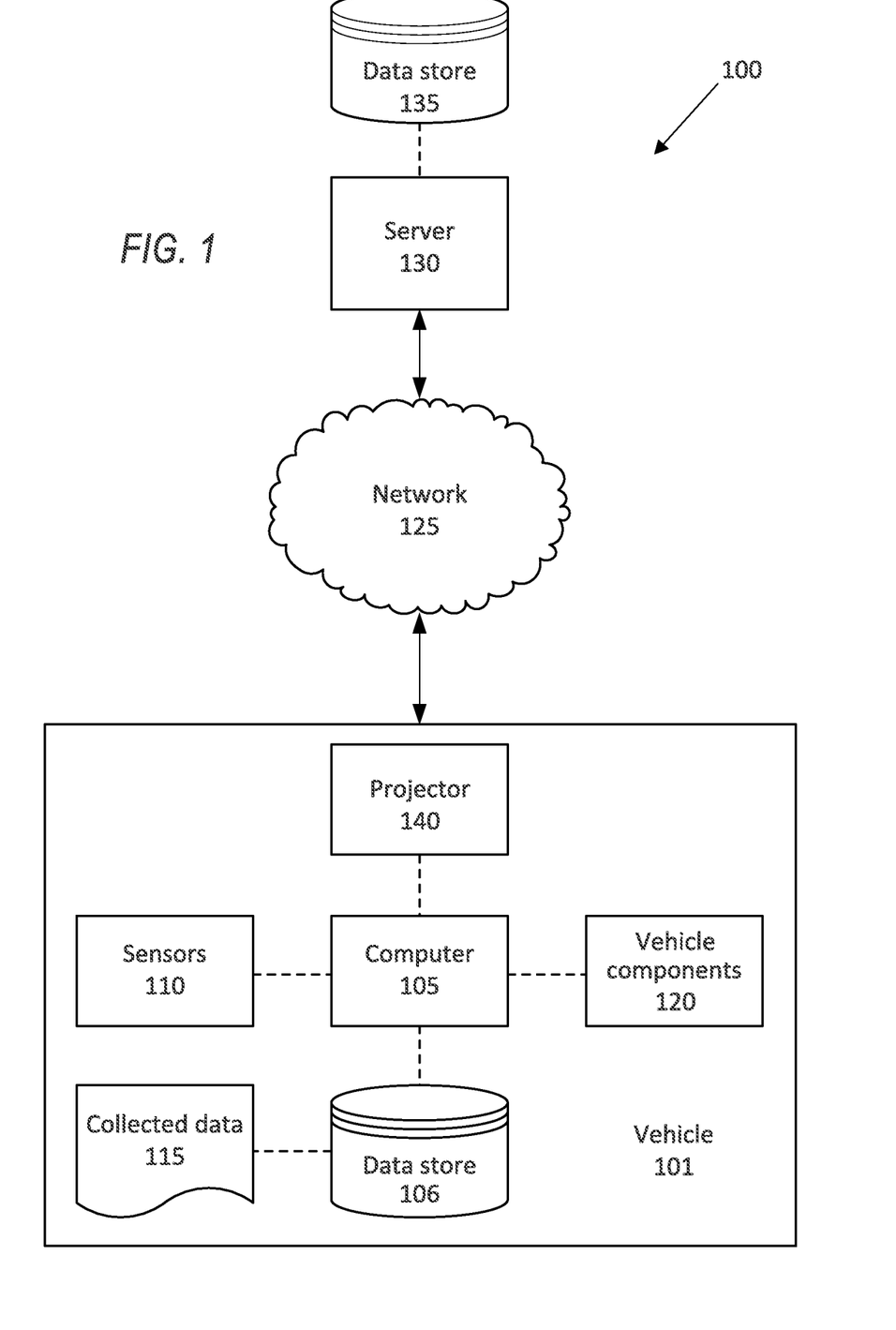
FIG. 1 is a block diagram of an example system for operating a display in a vehicle.

FIG. 1 illustrates an example system 100 for operating a projector 140 in a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure.

In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any type, e.g., hard disk drives, solid state drives, servers, or any volatile or non-volatile media. The data store 106 may store the collected data 115 sent from the sensors 110.

Sensors 110 may include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. In this context, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a display projector 140. The display projector 140 emits light to display images in the vehicle 101. The computer 105 can instruct the display projector 140 to display images based on collected data 115. For example, the computer 105 can display operating information, e.g., a vehicle 101 speed, a current time, an upcoming turn, etc.

Figure 2:
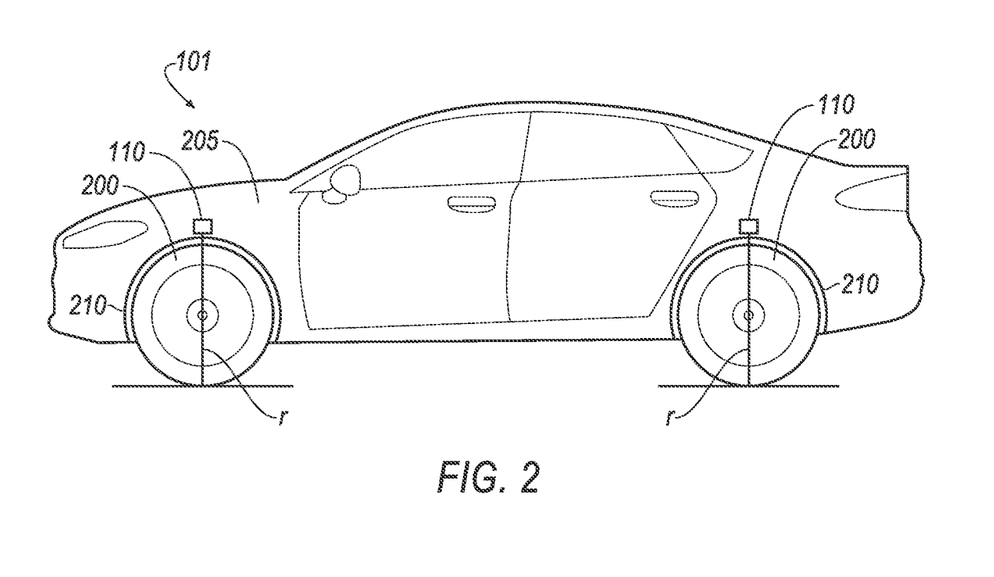
FIG. 2 is a side view of the example vehicle and a sensor determining a ride height of a wheel.

FIG. 2 illustrates an example vehicle 101. The vehicle 101 includes a wheel 200. The wheel 200 supports a body 205 of the vehicle 101. The wheel 200 is driven to rotate to move the body 205, propelling the vehicle 101. The vehicle 101 typically includes four wheels 200 (two of which are not shown in FIG. 2). The wheel 200 is disposed in a wheel opening 210.

The vehicle 101 can include a ride height sensor 110. As used herein, a "ride height" is the distance between the ground and the position of the ride height sensor 110, typically at the farthest point of the wheel opening 210 from the ground. To determine the ride height r, the ride height sensor 110 is positioned in the vehicle 101 body at a specified position, e.g., just above (e.g., within a centimeter) or substantially at the wheel opening 210. A vehicle 101 suspension can move the wheel 200 within the wheel opening 210, and the distance between the ride height sensor 110 and the ground can change when the wheel 200 is moved.

The ride height sensor 110 can determine the ride height r of the wheel 200 by, e.g., a ratiometric voltage meter that produces a voltage proportional to the movement of the wheel 200 in the vertical direction. The computer 105 can determine a value for the ride height r in units of distance, e.g., millimeters, from data 115 in units of voltage, e.g., millivolts by, e.g., a look-up table stored in the data store 106 correlating values of voltage from the ride height sensor 110 to values of distance. Alternatively, the ride height sensor 110 can be another sensor 110 that can measure the height of the sensor 110 relative to the ground, e.g., a radar, a lidar sensor, an ultrasonic transducer, etc. The vehicle 101 can include four ride height sensors 110, one for each wheel 200.

The computer 105 can determine a single ride height value $\bar{r}$, i.e., an "overall" ride height value $\bar{r}$, based on the data 115 from the ride height sensors 110. The computer 105 can use a data-filtering technique, e.g., a low-pass filter, a high-pass filter, a band-pass filter, etc., to reduce noise in the ride height data 115. The computer 105 can determine the overall ride height $\bar{r}$, e.g., an arithmetic mean of the ride heights r for each of the wheels 200, based on the filtered data 115. Alternatively, the overall ride height value $\bar{r}$ can be, e.g., a weighted average, a geometric mean, etc., of the ride heights r for each of the wheels 200.

Figure 3:
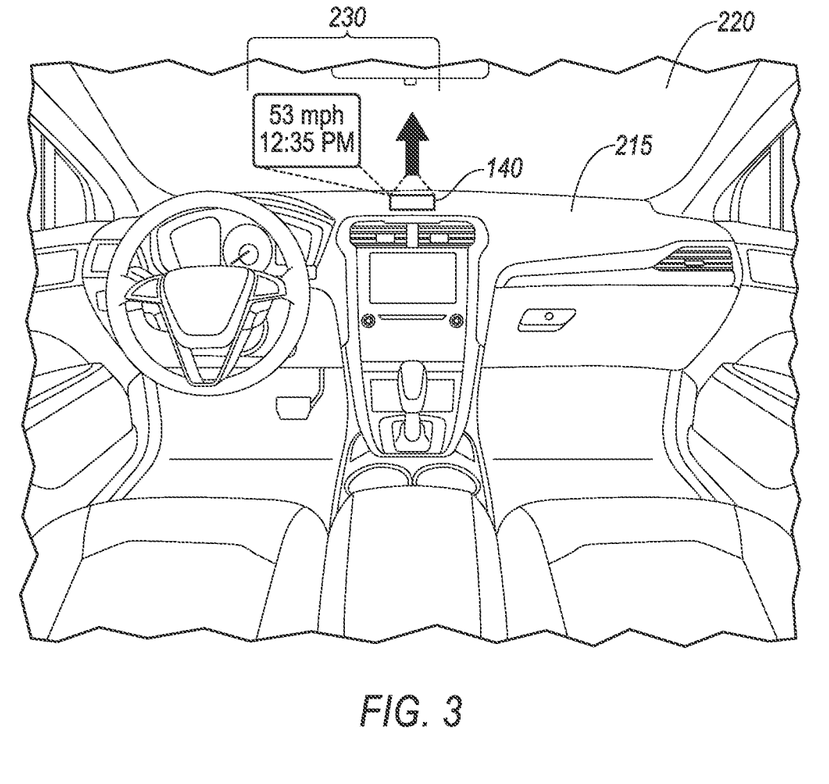
FIG. 3 is a front view of an instrument panel of the example vehicle.

FIG. 3 shows an example interior portion of the vehicle 101. The vehicle 101 can include an instrument panel 215. The instrument panel 215 may be disposed at a forward end of a passenger cabin and face toward the front seats. The instrument panel 215 may include vehicle controls, including a steering wheel. The instrument panel 215 moves (e.g., vibrates) when the overall ride height $\bar{r}$ changes as the vehicle 101 cabin moves.

The vehicle 101 includes the display projector 140. The display projector 140 is supported by the instrument panel 215. The display projector 140 emits light onto a windshield 220. The display projector 140 can emit light onto the windshield 220 to project images. The images constitute a heads-up display (HUD) 230. The computer 105 can instruct the display projector 140 to display images in the HUD 230 to provide information to the vehicle 101 user. For example, the computer 105 can display operating information, e.g., a vehicle 101 speed, a current time, an upcoming turn, etc., with the display projector 140 in the HUD 230. The HUD 230 can appear to overlay a roadway segment in front of the vehicle 101, e.g., the HUD 230 can display an arrow indicating a turn positioned to overlay the roadway segment in front of the vehicle 101, and the user, upon viewing the windshield 220, can see the HUD 230 displaying the arrow over a roadway lane of the roadway segment to indicate the turn in the roadway lane.

Figure 4:
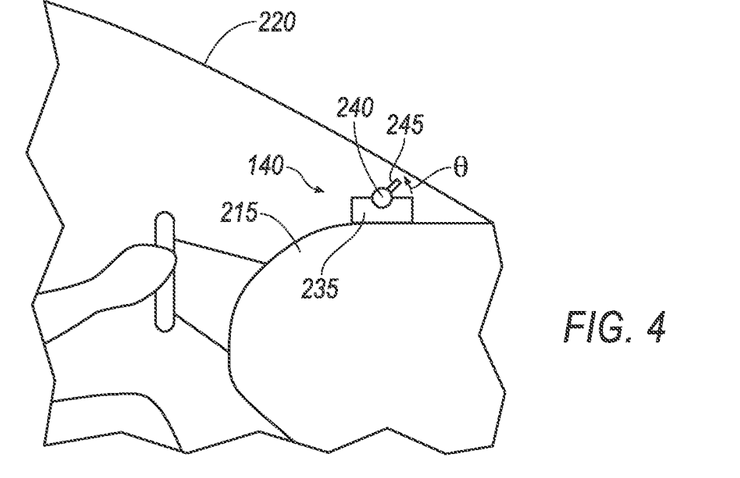
FIG. 4 is a side view of the instrument panel of the example vehicle.

FIG. 4 illustrates the display projector 140 on the instrument panel 215. The display projector 140 includes a projector base 235, a motor 240, and a projector emitter 245. The projector base 235 is secured to the instrument panel 215. Because the projector base 235 is fixed to the instrument panel 215, the projector base 235 moves when the overall right height $\bar{r}$ changes as the vehicle 101 moves.

The motor 240 is connected to the projector base 235 and rotates the projector emitter 245. The motor 240 is drivably connected to the projector emitter 245 so that it can rotate the projector emitter 245 to display the HUD 230 on specified locations on the windshield 220. The computer 105 can instruct the motor 240 to rotate the projector emitter 245. Thus, the motor 240 can compensate for movement of the projector base 235 from the change in the overall ride height $\bar{r}$.

The projector emitter 245 projects the HUD 230 onto the windshield 220. The projector emitter 245 can include a light source that emits light onto the windshield 220. At least some of the light can reflect off of the windshield 220 and toward the vehicle 101 cabin, providing images on the windshield 220 visible to vehicle 101 users. The projector emitter 245 defines a projector angle $\theta$ with the projector base 235. The projector angle $\theta$ can correspond to a specific location on the windshield 220 onto which the projector emitter 245 projects the HUD 230. When the motor 240 moves the projector emitter 245 from a first to a second projector angle $\theta$, the HUD 230 is moved from a first location to a second location on the windshield 220. In this context, a "location" on the windshield 220 is a specified point or area of the windshield identified by the computer 105, e.g., as an area in an X-Y coordinate system with the lower left corner of the windshield 220 as the origin.

Based on the overall ride height $\vec{r}$, the computer 105 can instruct the motor 240 to move the projector emitter 245 to a specific projector angle $\theta$. The computer 105 can determine the projector angle $\theta$ to compensate for changes in the overall ride height $\bar{r}$. For example, if the overall ride height $\bar{r}$ increases, the vehicle 101 cabin will rise, causing the HUD 230 to move up relative to the vehicle 101 user. The computer 105 can decrease the projector angle $\theta$, reducing the upward movement of the HUD 230 and allowing the vehicle 101 user to view the HUD 230 with reduced blurring and vibration.

In another example, the computer 105 can determine a "neutral" position for the HUD 230 upon activation of the vehicle 101 but prior to movement of the vehicle 101. The "neutral" position is the position of the HUD 230 relative to the windshield 220 at activation. The neutral position at the time of activation of the vehicle 101 can be defined as a specified projector angle $\theta_0$. As the overall ride height $\bar{r}$ changes, movement of the instrument panel 215 can move the HUD 230 from the neutral position, e.g., oscillating with vibration of the instrument panel 215 and movement of the windshield 220. As the instrument panel 215 vibrates and the windshield 220 moves, the computer 105 can dampen corresponding vibration and movement of the HUD 230. The computer 105 can use typical controlling techniques, e.g., a proportional-integral-derivative (PID) controller, to adjust the projector angle $\theta$ to dampen movement of the HUD 230 as the overall ride height $\bar{r}$ changes, reducing movement of the HUD 230 from the neutral position.

The computer 105 can determine the projector angle $\theta$ based on the overall ride height $\bar{r}$ with an angle-determining algorithm. As an example, to determine the projector angle $\theta$, the computer 105 can collect data 115 about the ride height r. The computer 105 can determine that the vehicle 101 is on a level surface when the data 115 indicate that the overall ride height $\bar{r}$ is less than a predetermined level threshold, e.g., $\bar{r} \leq 0.01$. The computer 105 can then determine the neutral position for the HUD 230, and the display projector 245 can display an indicator on the windshield 220 at the neutral position, e.g., a circular dot of light. A 2-dimensional X-Y grid can be placed on the windshield 220 having an origin at the neutral position. A sensor 110 in the vehicle 101 cabin, e.g., a camera, can collect image data 115 of the indicator on the windshield 220. The computer 105 can actuate one or more components 120 to move the vehicle 101 along a roadway with known uneven portions that move the wheels 200 to a specified ride height r. As the vehicle 101 moves along the roadway, the sensor 110 in the vehicle 101 cabin can collect data 115 about movement of the indicator on the windshield 220 in the grid away from the neutral position. The change in the location of the indicator corresponds to a change in the projector angle $\Delta\theta$. The computer 105 can compare the ride height data 115 and the changes to the overall ride height $\bar{r}$ to the changes in the location of the indicator on the windshield 220, and the corresponding change to the projector angle $\Delta\theta$. Thus, based on the change of the projector angle $\Delta\theta$, the computer 105 can determine a prescribed angle $\theta$ that could return the indicator (and thus the HUD 230) to the neutral position. The computer 105 can determine a correlation, based on the collected data 115, between the change in the overall ride height $\bar{r}$ and the change in location of the indicator and the corresponding change to the projector angle $\theta$. The computer 105 can store the correlation in the server 130. Thus, when the computer 105 operates the vehicle 101 on a roadway, the computer 105 can use the correlation to, upon determining the ride height $\bar{r}$, prescribe a projector angle $\theta$ that would return the HUD 230 to the neutral position on the windshield 220.

Figure 5:
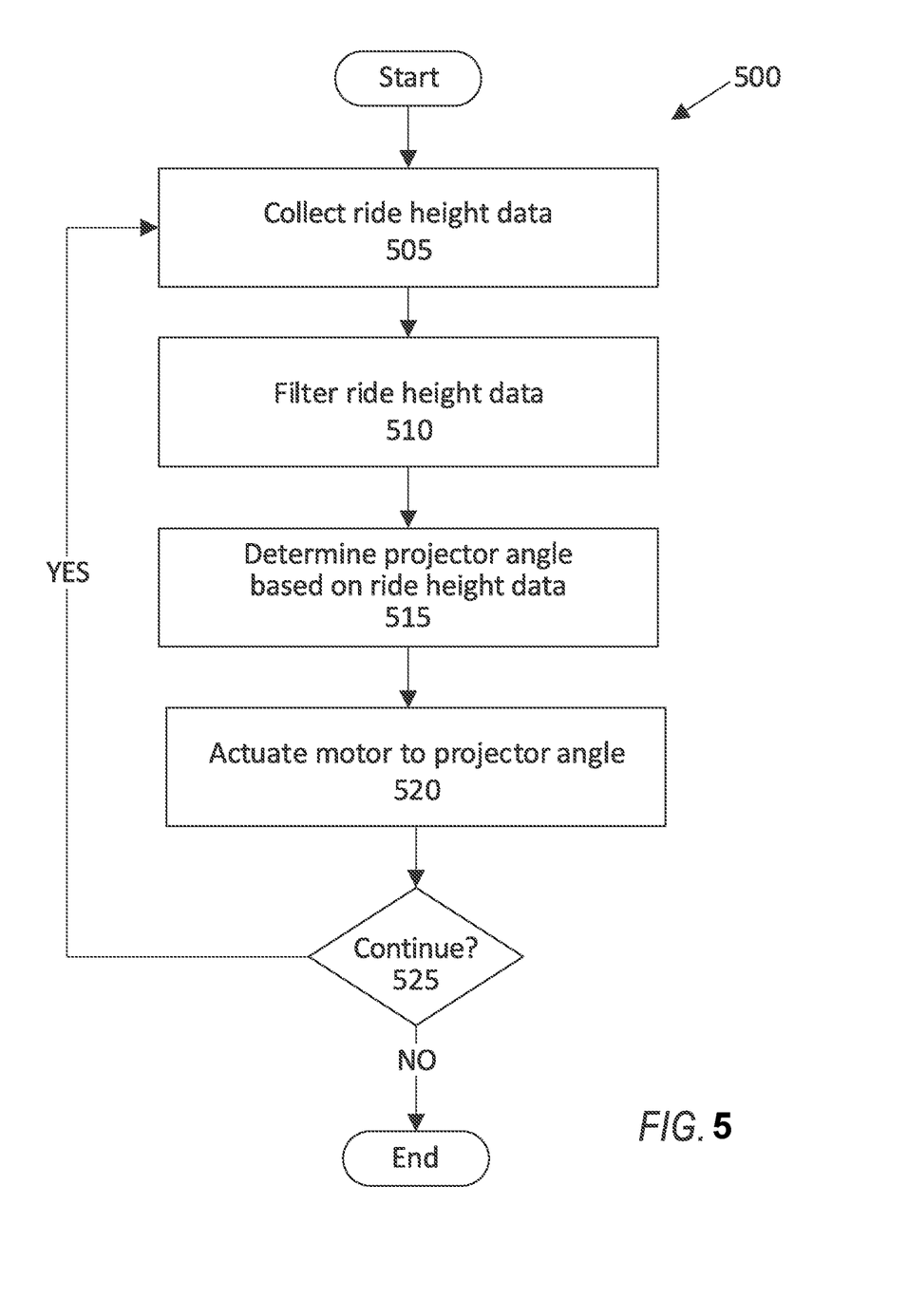
FIG. 5 is a block diagram of an example process for operating the display in the vehicle.

FIG. 5 illustrates an example process 500 for adjusting a display projector 140 in a vehicle 101. The process 500 begins in a block 505, in which the computer 105 collects data 115 about a ride height r for each wheel 200. The computer 105 can actuate a ride height sensor 110 disposed in a wheel opening 210 for each wheel 200 and collect data 115 of a distance between the top of the wheel opening 210 and the ground. The computer 105 can use changes to the ride height r to determine whether a vehicle 101 cabin will vibrate, causing the HUD 230 to move on the windshield 220.

Next, in a block 510, the computer 105 filters the ride height data 115. The computer 105 can use a data-filtering technique, e.g., a low-pass filter, a high-pass filter, a band-pass filter, etc., to reduce noise in the ride height data 115. By reducing the noise in the ride height data 115, the computer 105 can determine the ride height r for each wheel 200.

Next, in a block 515, the computer 105 determines a projector angle θ for the display projector 140 based on the ride height data 115. Based on the ride height data 115, the computer 105 can determine an overall ride height r̄. Changes in the overall ride height r̄ can move the HUD 230 on the windshield 220, and the computer 105 can determine the projector angle θ so that the HUD 230 remains in substantially the same position on the windshield 220 when the overall ride height r̄ changes. For example, if the overall ride height r̄ increases, the computer 105 can reduce the projector angle θ to compensate for a rise that the vehicle 101 cabin resulting from the increased overall ride height r̄.

Next, in a block 520, the computer 105 actuates the motor 240 to move the projector emitter 245 to the projector angle θ. The motor 240 can rotate the projector emitter 245 to the projector angle θ provided by the computer 105 to reduce the motion of the HUD 230 on the windshield 220.

Next, in a block 525, the computer 105 determines whether to continue the process 500. The computer 105 can determine to continue the process 500 when the vehicle 101 is still traveling along the roadway and the vehicle 101 cabin can vibrate based on changes to the overall ride height r̄. The computer 105 can determine not to continue the process 500 when the vehicle 101 is no longer moving on the roadway, e.g., the vehicle 101 is parked and the propulsion 120 is deactivated. If the computer 105 determines to continue, the process 500 returns to the block 505 to collect data 115 from the ride height sensors 110. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine a ride height of a vehicle wheel;
   determine an angle of the display projector between a base of the display projector and an emitter of the display projector based on a change of the ride height; and
   actuate a motor to move the display projector to the projector angle.

2. The system of claim 1, wherein the instructions further include instructions to determine a ride height for each of a plurality of wheels, to determine an average ride height based on the determined ride heights, and then determine the projector angle based on the average ride height.

3. The system of claim 1, wherein the instructions further include instructions to actuate the display projector to display an image on a windshield.

4. The system of claim 3, wherein the instructions further include instructions to display the image on a location of the windshield to overlay with a roadway segment.

5. The system of claim 3, wherein the instructions further include instructions to display vehicle operating information on the windshield.

6. The system of claim 1, wherein the instructions further include instructions to determine a neutral position of an image projected by the display projector and to determine the projector angle based on the ride height and a change in a height of the image from the neutral position.

7. The system of claim 1, wherein the instructions further include instructions to determine the projector angle to dampen movement of an image projected onto a windshield.

8. A system, comprising:
a display;
a projector directed at the display;
a motor connected to the projector;
a wheel of a vehicle;
means for determining a ride height of a vehicle wheel;
means for determining an angle of the projector between a base of the display projector and an emitter of the display projector in a vehicle instrument panel based on a change of the ride height; and
means for moving the projector to the projector angle.

9. The system of claim 8, further comprising means for actuating the display projector to display an image on a windshield.

10. The system of claim 9, further comprising means for displaying vehicle operating information on the windshield.

11. The system of claim 8, further comprising means for determining the projector angle to dampen vibrations from the wheel.

12. The system of claim 8, further comprising means for determining a neutral position of an image projected by the display projector and means for determining the projector angle based on the ride height and a change in a height of the image from the neutral position.

13. A method, comprising:
determining a ride height of a vehicle wheel;
determining an angle of a display projector between a base of the display projector and an emitter of the display projector in a vehicle instrument panel based on a change of the ride height; and
actuating a motor to move the display projector to the projector angle.

14. The method of claim 13, further comprising determining a ride height for each of a plurality of wheels, determining an average ride height based on the determined ride heights, and then determining the projector angle based on the average ride height.

15. The method of claim 13, further comprising actuating the display projector to display an image on a windshield.

16. The method of claim 15, further comprising displaying the image on a location of the windshield to overlay with a roadway segment.

17. The method of claim 15, further comprising displaying vehicle operating information on the windshield.

18. The method of claim 13, further comprising determining a neutral position of an image projected by the display projector and determining the projector angle based on the ride height and a change in a height of the image from the neutral position.

19. The method of claim 13, further comprising determining the projector angle to dampen movement of an image projected onto a windshield.

* * * * *

UNITED STATES PATENT AND TRADEMARK OFFICE
CERTIFICATE OF CORRECTION

| | | |
|---|---|---|
| PATENT NO. | : 10,634,924 B2 | |
| APPLICATION NO. | : 15/847228 | |
| DATED | : April 28, 2020 | |
| INVENTOR(S) | : Timothy Panagis et al. | |

It is certified that error appears in the above-identified patent and that said Letters Patent is hereby corrected as shown below:

In the Claims

Column 8, in Lines 54-56, replace "an angle of the display projection between a base of the display projector and an emitter of the display projector based on" with — an angle of the display projector based on —.

Column 9, in Lines 21-23, replace "angle of the projector between a base of the display projector and an emitter of the display projector in a vehicle" with — angle of the projector in a vehicle —.

Column 10, in Lines 8-10, replace "angle of the projector between a base of the display projector and an emitter of the display projector in a vehicle" with — angle of the projector in a vehicle —.

Signed and Sealed this
Tenth Day of November, 2020

Andrei Iancu
*Director of the United States Patent and Trademark Office*